ent Office 3,202,554
Patented Aug. 24, 1965

3,202,554
WELD ARRESTING COMPOSITIONS
Jean-Claude Hornus, Neuilly-sur-Seine, France, assignor to Olin Mathieson Chemical Corporation, East Alton, Ill., a corporation of Virginia
No Drawing. Filed Feb. 7, 1962, Ser. No. 171,559
Claims priority, application France, Feb. 10, 1961, 852,359
3 Claims. (Cl. 148—22)

This invention relates to weld arresting compositions used to create weld free zones in metal fabricating operations.

During the cold or hot autogenous welding of two metals (pressure or roll welding) subsequent fabrication steps may necessitate the creation of weld-free zones. Such zones are formed by interposing between the metals a substance called a weld-arrester. Following the welding operation the unwelded parts are subjected to an internal pressure (swelling pressure) by the use of a liquid under pressure. The procedure outlined permits the fabrication of articles such as heat exchangers. During fabrication, the weld-arrester must not undergo degradation nor lose its ability to resist piezolytic and/or thermolytic welding and at the same time be capable of at least quadrupling its surface by cleavage.

Lamellar graphite, both natural and synthetic, has been used as a weld-arrester. However, because of its position in the electromotive force series, its use presents certain drawbacks traceable to the risk of glavanic corrosion at the welded joints with most of the metals used. Thus, in systems containing aqueous liquids in which the ducts are formed by the non-welded portions of two metal sheets, such as may be obtained according to U.S. Patent 2,690,002 filed on November 18, 1949, corrosion takes place in the ducts when graphite is used as the weld-arrester. A preliminary rinse does not achieve complete removal of the graphite, viewed from the aspect of galvanic processes.

Accordingly, one object of this invention is to provide a weld-arresting composition which does not have these drawbacks.

Another object of this invention is to provide a weld-arresting composition which produces no corrosive substances to impair the utility of welded objects.

A further object of this invention is to provide an economical and easily producible weld-arresting composition which is free of corrosive producing substances.

A further object of this invention is to provide a weld-arresting composition consisting essentially of natural silicates and a thickener to adjust the consistency of the composition.

These and other objects will become more apparent from the following description and claims.

The present invention is aimed at obtaining weld-arresters characterized in that they essentially consist of an aqueous solution of a finely divided and cleavable natural silicate, for example from 3 to 40% thereof, to which is added a thickener for the purpose of adjusting the consistency of the solution to the requirements of the application, for example from 1 to 25% thereof.

The silicates used are capable of undergoing cleavage and have a cold or hot dry lubricating power similar to that of graphite and of molybdenum sulfide when the latter is used below 200° C. The natural silicates must be sufficiently pure to be non-corrosive. Thus, talc must be freed of all corrosive impurities such as silica, iron, and iron oxides. As far as particle size distribution is concerned, the silicates used are selected from among the grades offering the greatest specific surface, e.g., exceeding a minimum of 35 m.$^2$/g. and if possible attaining 600 m.$^2$/g. In order to achieve good covering power as well as the required precision and sharpness in the printed designs outlining the weld-free zones, it is necessary to select a powdered product which leaves no residue on a 250 sieve. The latter requirement may be totally independent of the preceding requirement.

Among the silicates used one may list high grade natural talc, micronized or expanded natural mica, synthetic talc or mica, or certain grades of asbestos and shales (slate). More generally, aluminum and/or alkaline earth silicates possibly containing small amounts of alkali silicates are used. All other corrosive compounds or impurities must be carefully eliminated.

The water used in preparing the silicate solution must be pure. Distilled or demineralized water free of organic acid or mineral traces is used. Only carbonic acid may be tolerated.

The thickener may consist, for example, of an aqueous solution of polyvinyl alcohol, again prepared with pure water. Hyprophylic bentonite, i.e., a substance having a high swelling power in the presence of water, may also be used. It follows that the thickener is an aqueous gel prepared either from certain synthetic resins (i.e., methylcellulose, in addition to polyvinyl alcohol) or from certain aluminum silicates capable of undergoing a marked increase in volume on contact with water. The choice of thickeners is governed by the rolling rate, the temperature, and the swelling pressure.

It may be necessary to add small amounts of wetting and antifoam agents. The wetting agent could aid the dissolution of the silicate base used in the weld-arresting formulation; a condensation product of octylphenol and ethylene oxide is suitable for use with talc. Octyl alcohol or one of its esters may be used as the antifoam agent.

It is known that the weld-arresting formulation may be applied to the zones which are to be protected in a variety of ways; by stenciling, rolling, with a spray gun, or by screen printing. The consistency of the weld-arrester thus will vary and can be regulated by the use of an appropriate ratio of thickener to the amount of silicate contained in solution.

For clarification purposes, two non-limiting examples of weld-arrester formulations are given below. The examples contain a number of numerical data on the percentages of constituents which are required for varying processing conditions.

*Example I*

Natural talc is purified and ground until no residue is left on a 250 sieve, following which a pure-water solution having the following composition is made up:

A

Talc _____ 5 to 40% by weight.
Pure water _____ Balance to 100%.

A very small quantity of wetting agent prepared by the copolymerization of octylphenol and ethylene oxide is added to a small portion of the water which is gradually added to the talc in a mixer.

The following solution is made up separately:

B

Polyvinyl alcohol _____ 1 to 20% by weight.
Pure water _____ Balance to 100%.

The proportion of polyvinyl alcohol is regulated in accordance with the amount of talc used and the degree of consistency to be achieved in the final product. The required amount of solution B is then poured into solution A with continuous agitation. If necessary, a small quantity of antifoam agent such as octyl alcohol or one of its esters is added to the solution A before mixing.

Example II

The following mixture is made up as described above:

| | |
|---|---|
| Talc or mica of the grade indicated above leaving no residue on a 250 sieve | 3 to 30% by weight. |
| Hydrophylic bentonite | 2 to 25%. |
| Pure water | Balance to 100%. |

The proportion of bentonite used is precisely selected in accordance with the quantity of talc or mica used and with the desired consistency of the weld-arresting product.

Deposits of the products described above on a given base metal are absolutely harmless from the point of view of galvanic corrosion, hence rinsing is eliminated in the majority of applications with a corresponding reduction in fabrication cost.

The deposits of the weld-arresting products described above are homogeneous over the entire imprinted surface with sharp boundaries and no rough edges between the zones to be protected and the zones to be welded. It should be noted that the formulations specified above do not contain any product susceptible of undergoing degradation under process conditions and of emitting harmful decomposition products which can be absorbed by the untreated portions which are to be welded.

Although the invention has been described with reference to specific embodiments and details, various modifications and changes within the scope of this invention will be apparent to one skilled in the art and are contemplated to be embraced within the invention.

What is claimed is:

1. A weld-arresting composition consisting of an aqueous solution containing from 3 to 40% of a finely divided cleavable silicate, from 1 to 25% of a thickener which adjusts the consistency of the composition selected from the group consisting of a synthetic resin and hydrophylic bentonite, and the balance essentially water, said composition being free from corrosive impurities.

2. A composition according to claim 1 wherein said silicate is talc in an amount from 5 to 40% by weight.

3. A composition according to claim 1 wherein said silicate is mica in an amount from 3 to 30% by weight.

References Cited by the Examiner

UNITED STATES PATENTS

| | | | |
|---|---|---|---|
| 2,181,835 | 8/37 | Place | 113—512 X |
| 2,196,232 | 4/40 | Sweeney | 148—22 |
| 2,308,070 | 1/43 | Frey | 148—22 |
| 2,898,253 | 8/59 | Schneider et al. | 148—22 |
| 3,106,014 | 10/63 | Brick et al. | 29—470.9 |

DAVID L. RECK, *Primary Examiner.*

WINSTON A. DOUGLAS, *Examiner.*